United States Patent
Gendre et al.

(10) Patent No.: US 9,610,725 B2
(45) Date of Patent: Apr. 4, 2017

(54) METHOD AND MACHINE FOR MANUFACTURING CONTAINERS ALLOWING A MODIFICATION OF HEATING RATE

(75) Inventors: Julien Gendre, Octeville sur Mer (FR); Thierry Deau, Octeville sur Mer (FR); Mikael Derrien, Octeville sur Mer (FR)

(73) Assignee: SIDEL PARTICIPATIONS, Octeville Sur Mer (FR)

( * ) Notice: Subject to any disclaimer, the term of this patent is extended or adjusted under 35 U.S.C. 154(b) by 630 days.

(21) Appl. No.: 13/483,965

(22) Filed: May 30, 2012

(65) Prior Publication Data
US 2012/0326345 A1   Dec. 27, 2012

(30) Foreign Application Priority Data
Jun. 23, 2011   (FR) ...................................... 11 55579

(51) Int. Cl.
*B29C 49/78* (2006.01)
*B29C 49/68* (2006.01)
*B29C 49/06* (2006.01)

(52) U.S. Cl.
CPC ............ *B29C 49/78* (2013.01); *B29C 49/783* (2013.01); *B29C 49/786* (2013.01); *B29C 49/06* (2013.01); *B29C 49/68* (2013.01)

(58) Field of Classification Search
CPC ................ B29C 47/92; B29C 67/0088; B29C 45/76–45/80; B29C 45/768; B29C 49/78; B29C 49/783; B29C 49/786

USPC ........... 264/40.1, 259, 40.3, 40.5, 40.7, 454; 425/522, 526; 700/197, 200–205
See application file for complete search history.

(56) References Cited

U.S. PATENT DOCUMENTS

| | | | |
|---|---|---|---|
| 7,585,449 B2 * | 9/2009 | Nicol et al. | 264/334 |
| 2009/0108505 A1 * | 4/2009 | Steiner | 264/535 |
| 2011/0062611 A1 * | 3/2011 | Menary et al. | 264/40.1 |
| 2011/0175246 A1 * | 7/2011 | Winzinger | 264/40.1 |
| 2011/0236518 A1 * | 9/2011 | Cetinel | B29B 13/024 425/170 |

FOREIGN PATENT DOCUMENTS

| | | | | |
|---|---|---|---|---|
| AT | | 000521 U1 * | 12/1995 | B29C 49/64 |
| FR | WO 2010031923 A1 * | | 3/2010 | B29B 13/024 |

OTHER PUBLICATIONS

AT000521 U1 (Machine Translation). Provided by Espacenet.*

* cited by examiner

*Primary Examiner* — Matthew Daniels
*Assistant Examiner* — Leith S Shafi
(74) *Attorney, Agent, or Firm* — Sughrue Mion, PLLC

(57) ABSTRACT

A machine for manufacturing containers from blanks of plastic material, which includes an oven furnished with a plurality of radiation sources for heating blanks as they travel through at a predetermined speed of travel and heating profile, and a programmed control center for modifying the speed of travel and heating profile based on a temperature measurement made on a blank leaving the oven, and a pressure measurement made in the blank during a subsequent blowing.

8 Claims, 4 Drawing Sheets

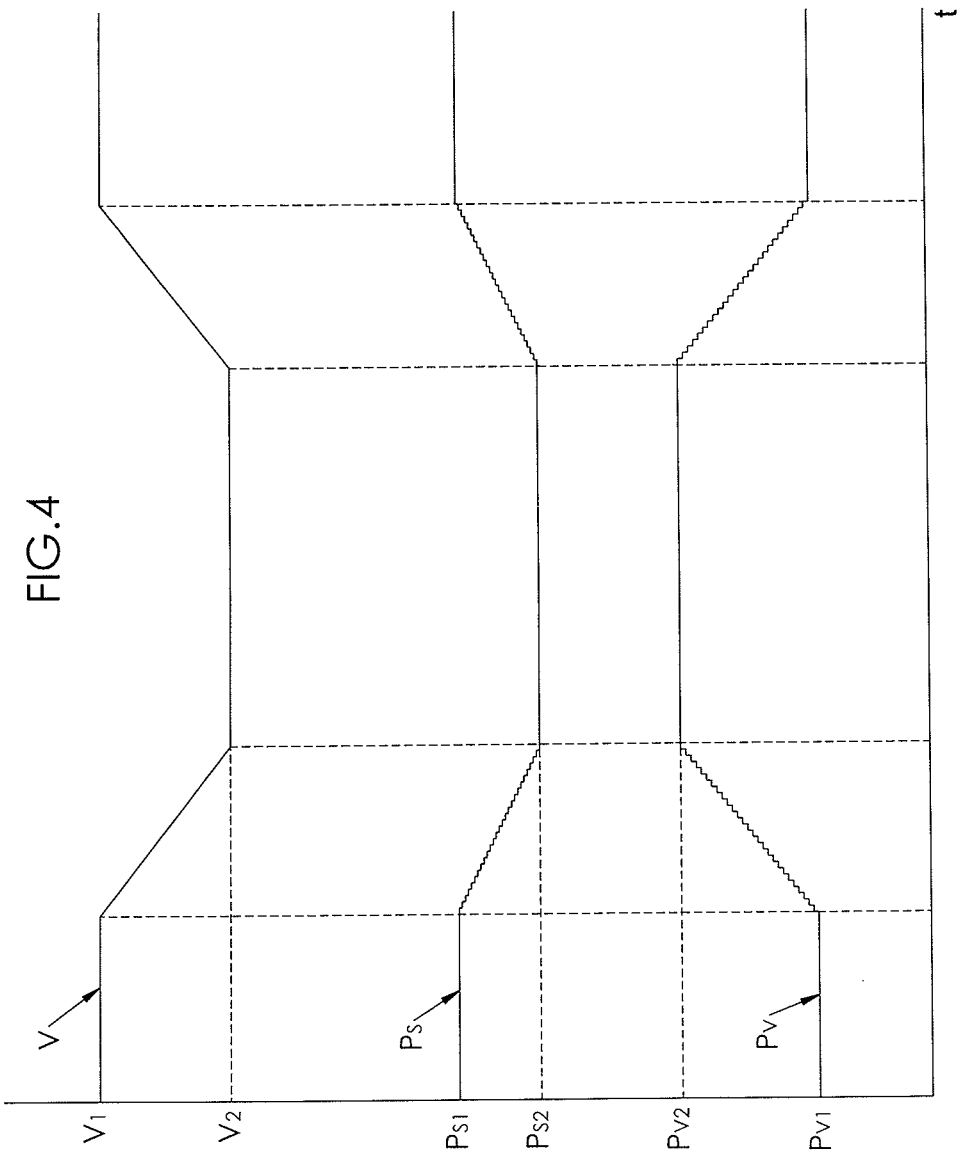

METHOD AND MACHINE FOR MANUFACTURING CONTAINERS ALLOWING A MODIFICATION OF HEATING RATE

The invention concerns the manufacture of containers, particularly bottles, vials, by forming from blanks (generally preforms, although it may involve intermediate containers) made of plastic material such as polyethylene terephthalate (PET).

The manufacture of a container involves two principal phases, i.e., a phase of heating the blank, during which the blank moves past a heating unit, followed by a blowing phase wherein the blank thus heated is transferred into a molding unit, and a fluid under pressure (generally a gas, ordinarily air) is injected into the blank to give it the final shape of the container.

In the heating unit (currently called "oven"), the blanks move along in front of a row of infrared radiation sources—generally halogen lamps—at a predetermined speed and heating profile.

The speed of travel of the oven is the linear speed at which the preforms circulate, which are hooked to revolving supports or "spinners" mounted on a chain driven in motion by a sprocket wheel. Each spinner is attached to a pinion meshing with a rack to drive the preform in rotation around its axis while it moves.

The heating profile, i.e., the profile of the amount of energy actually received by the blanks in the oven during the heating phase, is determined primarily by three controllable heating parameters:

the power of the infrared radiation emitted by the sources, which determines the total quantity of energy injected into the oven;

the topography of the oven, and particularly the presence of reflectors facing the sources, which determines a quantity of energy not absorbed directly by the blanks but reinjected into the oven by reflection;

the rate of forced ventilation of the blanks, which determines a quantity of energy evacuated from the oven.

Oven structures are particularly described in SIDEL patents FR 2 703 944, FR 2 907 684, FR 2 863 932 (and in their respective American equivalents U.S. Pat. No. 5,681,521, US 2009/317506, U.S. Pat. No. 7,553,156).

The heating and blowing units are generally part of a production line that also includes a filling unit (or filler), associated with a capping unit, as well as possibly a labeling unit and a packaging unit (for example, a bundling machine).

On any production line, there is a critical machine that imposes its tempo on the line as a whole. In this instance, the critical machine is the filler.

In order to compensate for the differences in speed of the different machines, buffer stocks are established between them, by means of accumulation conveyors whose capacity is generally adjustable to allow the stock to be adapted to the variations in speed.

However, accumulation conveyors are expensive and require a great deal of space, and it would theoretically be more profitable to vary the rate of each machine to adapt it to the rate of the critical machine.

In practice, though, although the rate for some machines (particularly the blowing unit) can be effectively varied (to a limited degree, on the order of a few %) without affecting the quality of production, some machines are not designed to withstand that kind of variation. This is particularly the case for the oven, which, once it has reached its steady state, could not have its rate varied during production without accepting an uncontrolled drift in the quality of the containers produced.

Currently, specialized operators in charge of the ovens apply a standardized heating profile for each production run based on the type of blank to be heated, and a constant rate of heating (i.e., the speed of travel of the preforms) determined by the rate of production imposed by the critical machine. Although the operators can apply manual corrections to the heating parameters from time to time, as a function of the perceived quality of the containers evaluated subjectively, the risks of uncontrolled deviation of the quality of the containers produced are too great to allow the operators the freedom to modify the rate of the oven. In fact, in practice, the rate of the oven is fixed at a steady state.

The invention seeks to allow a modification (which can be substantial) of the rate of heating, while maintaining the quality standard of the production.

To that end, first, a method of manufacturing containers of plastic material is proposed, which comprises:

a phase of heating blanks as they pass through an oven provided with a plurality of radiation sources, at a predetermined speed and heating profile;

a phase of blowing the blanks in a blowing unit, in order to form the containers, said method comprising the operations consisting of:
a) modifying the speed of movement of the blanks;
b) modifying the heating profile;
c) establishing, at the end of a heating phase, an actual thermal profile of at least one blank;
d) measuring, during the blowing phase, the pressure in said blank and detecting at least one singular pressure point;
e) measuring a first difference between the actual thermal profile of the blank and a theoretical thermal profile, and a second difference between the singular pressure point and a theoretical singular point;
f) as long as the differences are not both below a respective predetermined tolerance, repeat operations b) to e);
g) when the differences are both below the respective tolerance, and while the speed of travel has not reached a predetermined final value, repeat operations a) to e).

Various additional characteristics of this method can be provided, alone or in combination:

the thermal profile comprises a thermography of the blank;

the thermal profile comprises a temperature measurement made on an outer wall of the blank;

the thermal profile comprises a temperature measurement made on an inner wall of the blank;

the singular pressure point is a local pressure peak;

the heating profile comprises the electric power delivered to the radiation sources;

the heating profile comprises the electric power delivered to a ventilation system of the oven.

Proposed in the second place is a computer program intended to be stored in memory of a processing unit and/or stored on a memory medium readable by a reader of a processing unit, comprising instructions for implementing operations a) to g) of the method described above.

Proposed in the third place is a machine for manufacturing containers from blanks of plastic material, which comprises an oven furnished with a plurality of radiation sources, for heating blanks as they travel through at a predetermined speed of travel and heating profile, and a programmed control center for modifying the speed of travel and heating profile based on the temperature measurement made on a blank leaving the oven, and a pressure measurement made in said blank during a subsequent blowing.

Various additional characteristics of this machine can be provided, alone or in combination:

the control center is programmed to modify the electric power delivered to the sources;

the control center is programmed to modify the electric power delivered to the ventilation system of the oven.

Other objects and advantages of the invention will be seen from the following description with reference to the appended drawings in which:

FIG. 4 is a diagram in which curves are drawn illustrating heating and blowing parameters.

Figure 1:
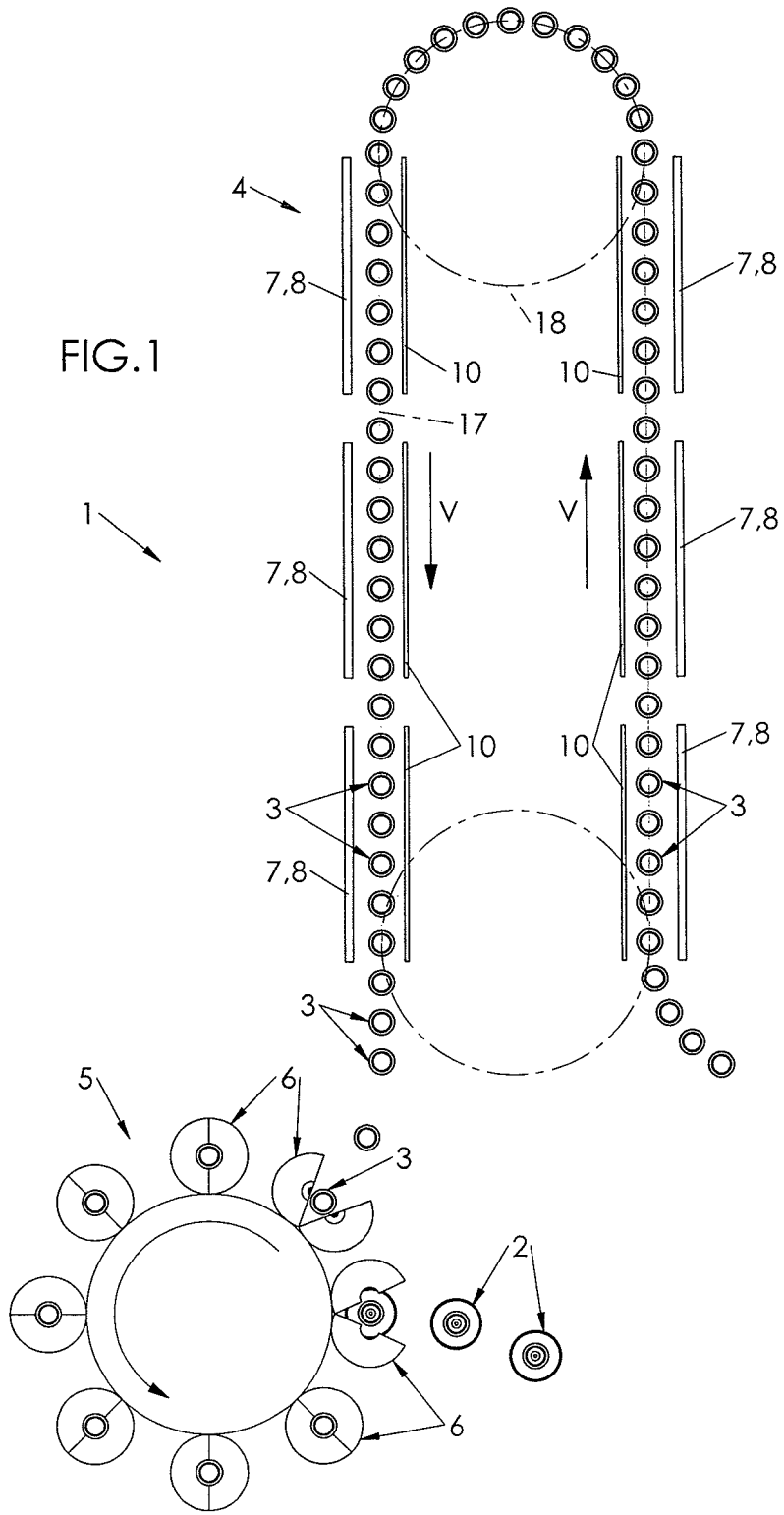
FIG. 1 is a diagrammatic top view showing a container manufacturing machine comprising a unit for heating blanks and a unit for blowing containers from heated blanks.
Figure 2:
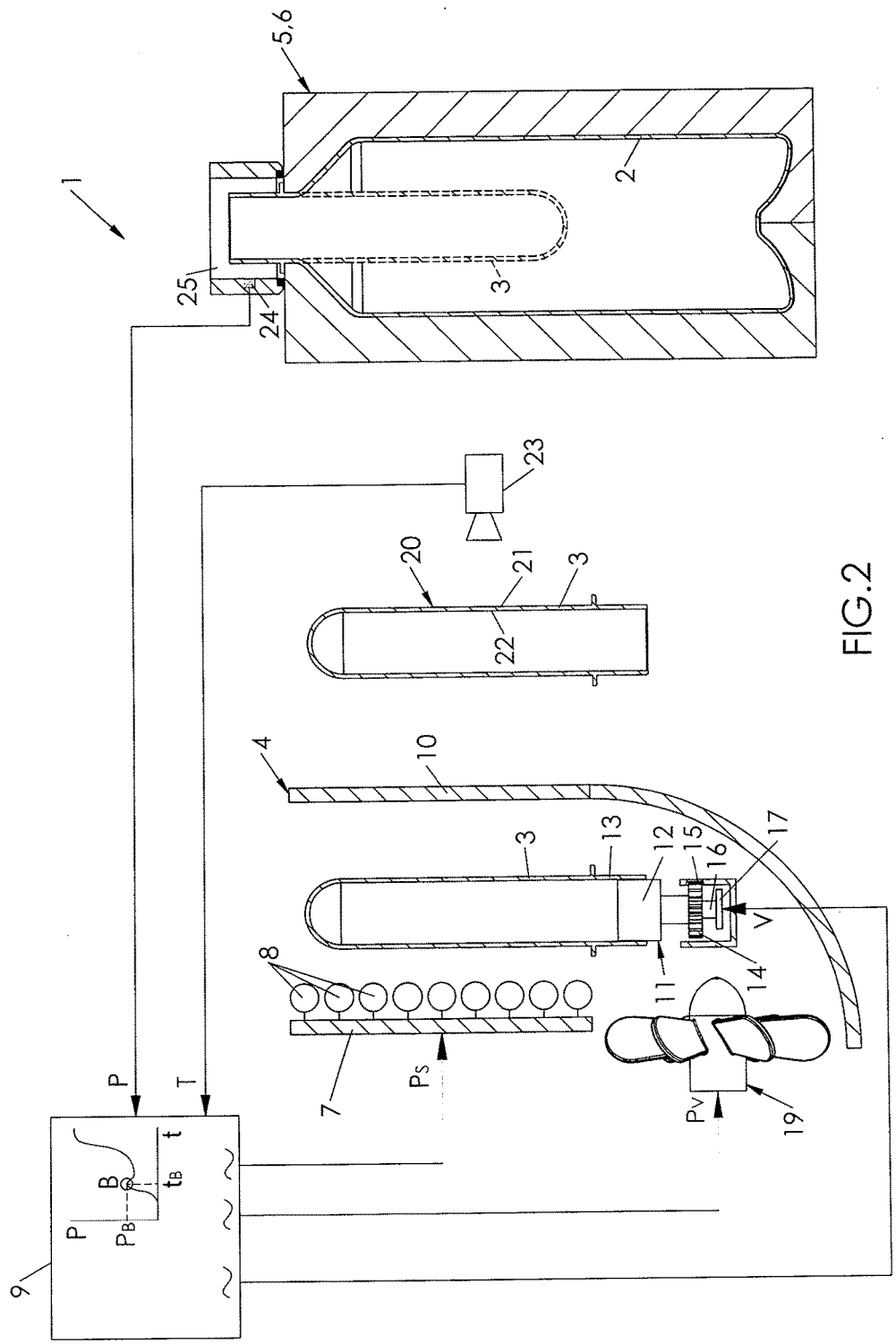
FIG. 2 is a diagrammatic view in cross-section partially showing the machine of FIG. 1.

Represented in FIGS. 1 and 2 is a machine 1 for manufacturing containers 2 from blanks 3 (which in this instance are preforms) made of plastic material such as PET. Said machine 1 comprises a heating unit 4, also called "oven," as well as a molding unit 5 furnished with a series of molds 6 mounted on a carousel and placed directly downstream from the oven 4.

The preforms 3 are conveyed through the oven 4 in order to be heated there prior to the blowing or stretch blowing operations in the molding unit 5. To that end, the oven 4 is equipped with a first emitting wall 7 provided with sources 8 of electromagnetic radiation emitting over a predetermined spectrum (in the domain of infrared, or possibly in the domain of microwaves) and at a predetermined power. Typically, the radiation sources 8 emitting in the infrared domain can be lamps (such as halogen lamps, as in the example illustrated in FIG. 2) or diodes, such as laser diodes, for example of the vertical cavity surface-emitting type (VCSEL). The electric power, indicated as $P_S$, furnished to the sources, as well as the spectrum of emitted radiation, are controlled by means of a programmable control center 9. In a conventional way, the oven 4 comprises, facing the emitting wall 7, a second reflecting wall 10, that at least partially reflects the radiation emitted by the sources 8 in order to limit dissipation losses and thus optimize the heating.

Each preform 3 is hooked to a rotational hanger 11, also called spinner, which comprises a pin 12 fitted in a neck 13 of the preform 3, as well as a pinion 14 meshing with a fixed chain 15 running along the path followed by the preforms 3 inside the oven 4. This method of conveyance ensures a substantially uniform rotation of the preform 3 during its heating. It should be noted that the conveyance of the preforms 3 can be done either with the neck 13 down (as in the illustrated example) or neck 13 up. Each spinner 11 is driven in rotation around a shaft 16 integral with a belt 17 driven in motion by a wheel 18, the motorization of which is controlled by the control center 9 at a predetermined speed V of linear travel, which is fixed at a steady state. Because the separation between the preforms 3 is fixed, the production rate (i.e., in practice, the quantity of preforms 3 leaving the oven 4 during a predetermined period of time, generally one hour) is directly proportional to the speed of travel V.

The heating of the preforms 3 is performed in such a way that the preforms 3 have an average heating temperature at the outlet of the oven 4 that is greater than the glass transition temperature of the material. Typically, the average heating temperature is about 140° C. for preforms 3 made of PET, the glass transition temperature of which is about 80° C. The transit of the preforms 3 between the outlet of the oven 4 and the entry of the molding unit 5 is short enough that the cooling of the preforms 3 by thermal dissipation is negligible.

According to one embodiment (particularly in the case where, as illustrated in FIG. 2, the sources 8 are halogen lamps, which dissipate heat), the oven 4 comprises a forced ventilation system 19 in the form of a blower generating a pulsed air flow directed toward the preforms 3 circulating in the oven 4, in order to evacuate part of the calories. The blower 19 is controlled by the control center 9, which controls the electric power, denoted $P_V$, delivered to the blower 19 (and thus the rate of the generated air flow).

The electric power $P_S$ furnished to the sources 8, the power $P_V$ furnished to the blower 19 and the speed V of travel of the preforms 3 are all three controlled by the control center, which is therefore programmed.

In order to adapt the production rate of the oven 4 to a variation in the rate of the critical machine (for example, a filling unit) located on the same production line, a change should be made to the travel speed V, either to increase it (increase the rate), or on the contrary to decrease it (decrease the rate), while preserving the quality of the containers 2 at the outlet of the molding unit 5.

Because the change in the travel speed V causes a change in the exposure time of the preforms 3 to the radiation heating them, said change requires a change of the heating profile in order to maintain the quality of the containers 2.

Experience shows that the quality of the container 2 depends in large part on the temperature profile of the preform 3 leaving the oven 4. In particular, a temperature of the preform 3 that is too low can result in the container 2 having a whitish, pearlescent appearance, a consequence of overdrawing the preform 3, causing a breakage of the polymerized long chains at the molecular level. On the contrary, a temperature of the preform 3 that is too high can cause spherulitic crystallization of the material, making the preform 3 unsuitable for blowing.

It has therefore been determined that any preform 3 leaving the oven 4 should have an actual thermal profile corresponding to a predetermined theoretical profile for which the quality of the container 2 is optimal. This does not necessarily mean that the actual thermal profile should be strictly equal to the theoretical profile, which in practice is impossible to achieve, but that the actual thermal profile should only differ from the theoretical profile by a certain tolerance that can be determined by a person skilled in the art through conducting ordinary tests, and for which the quality of the containers 2 obtained meets the requirements of the bottler.

The thermal profile can be reduced to a single average temperature measurement, made by means of a thermal sensor placed at the outlet of the oven 4. Preferably, however, the thermal profile comprises a plurality of temperature measurements made on the body 20 of the preform 3, particularly on an outer wall 21 and/or on an inner wall 22 thereof.

According to an embodiment illustrated in FIG. 2, the thermal profile comprises a thermography of the outer wall 21 on all or part of the body 20, performed by means of a thermal camera 23 (infrared) connected to the control center 9, to which the thermographic data are communicated by the camera 23.

According to another embodiment, the thermal profile comprises a temperature measurement or a thermography performed on the inner wall 22, which can be accomplished in accordance with the description of the French patent application no. FR 2 935 924 or its international equivalent no. WO 2010/031923, the content of which is incorporated here by reference.

However, it has been determined that although the control of the thermal profile of the preforms 3 is necessary to maintain the final quality of the containers 2 that are produced, this is not sufficient. Indeed, tests have shown that at substantially identical thermal profiles, and at equal mechanical characteristics (the preforms 3 can actually have defects of shape or material), two preforms 3 can result in containers 2 of unequal quality.

Feedback on the heating parameters ($P_S$ and $P_V$) based solely on the thermal profile of the preforms 3 exiting the oven 4 has thus been shown to be insufficient to control the quality of the containers 2.

However, tests have shown that by taking into account both the thermal profile and the changes in pressure in the preform 3 during blowing, effective feedback can be provided on the heating parameters in order to control the quality of the containers 2.

More specifically, it is not necessary to take into account the pressure curve in its entirety; it has been shown that it is sufficient to take into account at least one singular point on this curve.

In practice, it has even been shown to be sufficient to take into account a local pressure peak during a pre-blowing operation, corresponding to the plastic yield point of the preform 3, after which the radial expansion thereof begins in the mold 6.

The characteristics of this point, called point B, and its importance on the quality of the container 2, have been presented in the French patent application no. FR 2 909 305 (or in its international equivalent no. WO 2008/081108).

At first, it may seem that point B does not contribute any additional information relative to the sole thermal profile of the preform 3 at the outlet of the oven 4. Indeed, it is accepted that the position of point B is influenced by the average heating temperature of the preform 3: roughly speaking, an increase in the temperature causes an advance of the moment $t_B$ at which point B occurs, and a decrease in the corresponding pressure $P_B$; on the contrary, a decrease in the temperature theoretically causes a delay of the moment $t_B$ at which point B occurs, and an increase in the corresponding pressure $P_B$. These statements are true when relying only on considering an average temperature.

In reality, the heating profile of the preform 3 and point B do not furnish redundant information, but information that is complementary with respect to the intrinsic characteristics of the preform 3, making it possible to evaluate its suitability with a satisfactory theoretical model.

The hypothesis used to justify this finding is that, at a similar temperature profile, slight variations in temperature, whether they cannot be measured or it would be too cumbersome to take them into account, can appreciably affect the quality of the blowing, for which experience has shown that point B is a reliable—and measurable—indicator.

Thus, taking into account at the same time:
the temperature profile of the preform 3 at the outlet of the oven 4,
and a singular pressure point inside the preform during blowing (in this instance, point B),
makes it possible to have reliable feedback about the heating profile, so as to maintain the quality of the containers 3 during a change in the rate of the oven 4.

The pressure measurement in the container 2 can be taken by means of a pressure sensor 24, mounted for example (as illustrated in FIG. 2) in a nozzle 25 for injecting fluid into the preform 3, covering the mold 6 during blowing, and connected to the control center 9 to which the sensor 24 communicates its measurements.

The manufacture of containers 2 from preforms 3 comprises two principal phases, i.e., a phase of heating preforms 3 moving through an oven 4 at a predetermined speed of travel V and heating profile, and a consecutive phase of blowing the preforms 3 in the blowing unit 5, each preform 3 being inserted into a mold 6 as illustrated in FIGS. 1 and 2.

The speed of travel V and the heating profile (characterized by the power $P_S$ delivered to the sources 8 and the power $P_V$ delivered to the blower 19) are programmed in (and controlled by) the control center 8.

Figure 3:
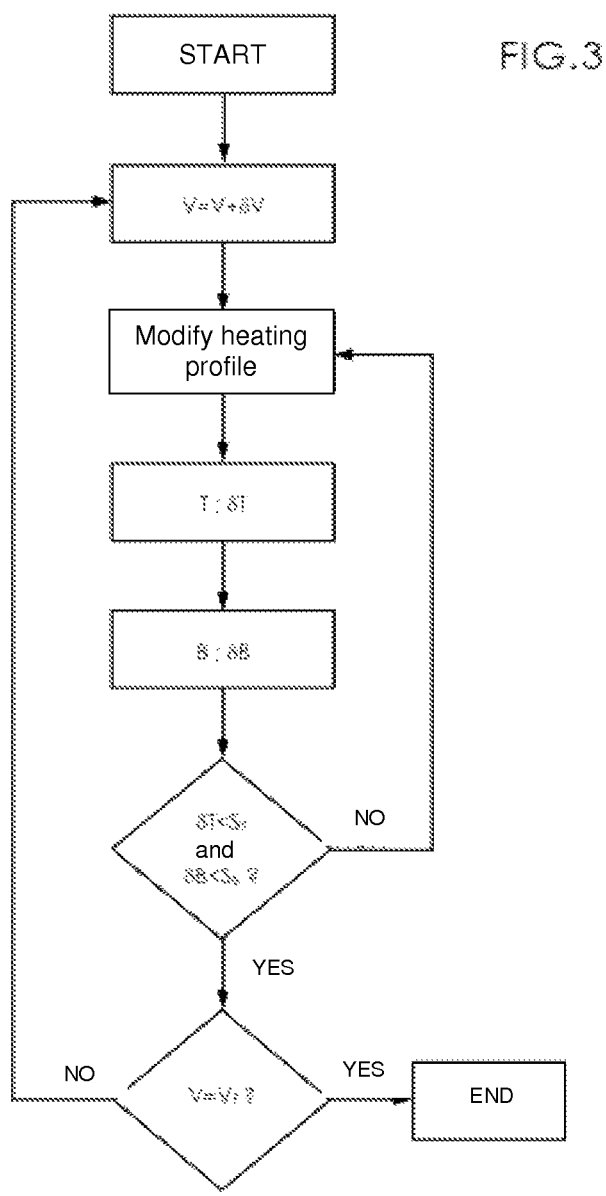
FIG. 3 is a functional diagram illustrating different steps of a controlled modification of the rate of heating.

Starting with an initial speed of travel $V_i$, the operational mode enabling this speed to be modified in order to reach a final speed $V_F$ will now be described. This operational mode is illustrated in FIG. 3.

The control center begins by controlling:
a) a modification of the travel speed V and
b) a modification of the heating profile,
simultaneously or quasi-simultaneously.

The modifications introduced are incremental and correspond only to a percentage of the final modification sought (less than 10%, and preferably less than 5% of the differential between the initial value and the final value of the modified parameter). In simple terms, the speed V is increased by a variation δV (positive or negative), the modified speed being equal to V+δV. Similarly, the power $P_S$ delivered to the sources 8 and/or the power $P_V$ delivered to the blower 19 are increased by a respective variation $δP_S$ or $δP_V$ (positive or negative), the modified power $P_S$ or $P_V$ being equal to $P_S+δP_S$ or respectively $P_V+δP_V$.

Specifically, the modification of the travel speed V can be performed by varying the rotation speed of the drive wheel 18 around which the belt 17 driving the preforms 3 circulates.

The following procedure is used after this first modification:
c) at the outlet of the oven 4 and at the end of a complete heating phase, an actual thermal profile is established of at least one preform 3 (or of a selection of preforms 3, or preferably of all of the preforms 3) that entered the oven 4 after the modification of the travel speed V and of the heating profile, then
d) during the blowing phase, a measurement is made of the pressure in said preform(s) 3.

The thermal profile is measured by means of the thermal camera 23, the result being a curve (or a scatter plot) corresponding to the variations of the temperature T according to a function f of the axial coordinate (or altitude, denoted Z) where the measurement is made on the preform 3, considering (which corresponds to the majority of cases, except for the case of preferential heating intended for the manufacture of containers that are not symmetrical in revolution) that at a constant altitude, the temperature T is constant. The temperature profile is therefore furnished by the curve T=f(Z).

The pressure measurement is made by means of the pressure sensor, the result being a curve (or a scatter plot) corresponding to the variations in the pressure P according to a function f of the time t elapsed since the insertion of the preform 3 in the mold 6: P=g(t).

The measurements T and P are continuously communicated to the control center 9. Said control center acquires the data, makes a respective comparison of the actual temperature profile with the stored theoretical profile, and detects in the pressure curve the programmed singular point (in this instance, point B). The control center 9 then performs the operations consisting of:

e) measuring a first difference δT between the actual thermal profile of the preform 3 and the theoretical thermal profile in memory; measuring a second difference δB between the actual singular pressure point (actual point B) and the theoretical singular point in memory (theoretical point B).

The difference δB between the actual point B and the theoretical point B can either be a difference $\delta P_B$ in the value of the pressure at point B, or a difference $\delta t_B$ in the value of the moment $t_B$ at which point B occurs.

The control center 9 then performs the operation consisting of:

f) comparing the thermal profile difference δT with a predetermined tolerance $S_T$ (stored in the control center), and comparing the difference δB ($\delta P_B$ and/or $\delta t_B$) with a predetermined tolerance $S_B$ (of pressure and/or time) also in memory.

If the differences δT and δB are not both lower than their respective tolerances $S_T$ and $S_B$, this means that a deviation has been determined in the quality of the preforms 3; the control center 9 then orders a repetition of operations b) to e) in order to correct the heating profile by iteration until the differences δT and δB fall within the specified tolerances.

As long as the differences δT and δB are within the specified tolerances $S_T$ and $S_B$ and the final value $V_F$ has not been reached, the control center 9 orders a repetition of operations a) to e), i.e., a reiteration of the operations to modify the heating rate and profile.

The operations described above can be executed by instructions from a computer program implemented in a processor of the control center 9, or on an external medium (such as CD-ROM) that can be read by said control center.

Illustrated in the diagram of FIG. 4 are two successive modifications of rate: first, starting with a high speed $V_1$, a decrease of the speed V to a low speed $V_2$ ($V_i=V_1$; $V_F=V_2$), then in reverse, starting with a low speed $V_2$, an increase of the speed V to the high speed $V_1$ ($V_i=V_2$; $V_F=V_1$). Drawn on the diagram are:

the curve illustrating the variation of the speed of travel V, the curve illustrating the variation of the electric power $P_S$ furnished to the sources 8, and
the curve illustrating the variation of the electric power $P_V$ furnished to the blower 19.

For the sake of simplicity, a linear, continuous decrease of the speed V is represented. However, the variations by brackets of the powers $P_S$ and $P_V$ illustrate the modifications of these parameters by successive iterations ($\delta P_S$ and $\delta P_V$), ordered by the control center 9 in accordance with the variations of rate. It can be seen on the diagram that the process is reversible. During the first rate modification, the power $P_S$ decreases by successive steps from a high value $P_{S1}$ to a low value $P_{S2}$; then, during the second rate modification, the power $P_S$ increases by successive steps from the low value $P_{S2}$ to the high value $P_{S1}$. In parallel, the power $P_V$ first increases by successive steps from a low value $P_{v1}$ to a high value $P_{v2}$; then, during the second rate modification, the power $P_v$ decreases by successive steps from the high value $P_{v2}$ to the low value $P_{v1}$.

It has been determined that modifying just the power parameters $P_S$ delivered to the sources and the power $P_V$ delivered to the ventilation system is sufficient to maintain the quality of the containers 2 during a modification of the rate of the oven 4.

This finding can be explained by the following theory.

In a first approximation, the amount of energy $E_P$ actually absorbed by the preforms 3 in the oven 4 is equal to the amount of energy $E_S$ emitted by the sources 8, minus the amount of energy $E_V$ evacuated from the oven 4 by the ventilation 19 and the amount of energy $E_F$ absorbed by the components of the oven 4 itself, which undergo heating:

$$E_P \approx E_S - E_V - E_F$$

It can be reasonably estimated that the amount of energy $E_F$ absorbed by the components of the oven 4 is negligible when it is considered that the great majority of the components subject to the radiation are reflectors that absorb only a marginal amount of the radiation they receive, most of it being reflected toward the preforms 2.

Therefore, in a second approximation the amount of energy $E_P$ actually absorbed by the preforms 3 in the oven 4 is substantially equal to the amount of energy $E_S$ emitted by the sources 8, minus the amount of energy $E_V$ evacuated from the oven 4 by the blower 19:

$$E_P \approx E_V - E_E$$

Moreover, it is estimated according to a good approximation that:

the amount of energy $E_S$ emitted by the sources 8 is proportional to the absorbed electric power $P_S$, while accepting that their performance is constant: $E_S \approx K1 \cdot P_S$, where K1 is a positive constant;

the amount of energy $E_V$ evacuated from the oven 4 by the blower 19 is proportional at the same time to the electric power $P_V$ absorbed by the blower 19 and to the amount of energy $E_S$ emitted by the sources 8 (i.e., to the electric power $P_S$ absorbed by the sources 8): $E_V \approx K2 \cdot P_S \cdot P_V$, where K2 is a positive constant.

Thus, the amount of energy $E_P$ actually absorbed by the preforms 3 can be expressed as follows:

$$E_P \approx (K1 - K2 \cdot P_V) P_S$$

It can be seen that according to this approach, the energy $E_P$ actually absorbed by the preforms 3 increases linearly or quasi-linearly with the increase of the electric power $P_S$ furnished to the sources 8, and on the contrary decreases linearly or quasi-linearly with the increase of the electric power $P_V$ furnished to the blower.

When it is thus configured and programmed, the machine 9 (and its method) makes it possible to make an automatic modification of the rate of the oven 4 while maintaining the quality of the containers 2. The result is a better adaptability of the oven 4 in the production line, and the possibility of varying the rate continuously during production, while limiting the losses of nonconforming containers 2.

The invention claimed is:

1. A method of manufacturing containers from blanks of plastic material on a production line comprising a critical machine having a proper tempo, the method comprises:

a phase of heating blanks as they pass through an oven provided with a plurality of radiation sources, at a predetermined speed of travel (V) and heating profile;
a phase of blowing the blanks in a blowing unit, in order to form the containers, said method comprising:
(a) modifying the speed (V) of movement of the blanks in accordance with the tempo of the critical machine, wherein the modification is incremental and corresponds only to a percentage of a final modification sought;
(b) modifying the heating profile with regard to the modified speed;

(c) establishing, at the end of a heating phase, an actual thermal profile of at least one blank;

(d) measuring a pressure in said blank during the blowing phase and detecting at least one singular pressure point (B);

(e) measuring a first difference between the actual thermal profile of the blank and a theoretical thermal profile, and a second difference between the singular pressure point and a theoretical singular pressure point;

(f) as long as the differences are not both below a respective predetermined tolerance, repeat operations b) to e);

(g) as long as the differences are both below the respective tolerance, and while the speed of travel (V) has not reached a predetermined final value, repeat operations a) to e).

2. The method according to claim 1, characterized in that the actual thermal profile comprises a thermography of the blank.

3. The method according to claim 1, characterized in that the actual thermal profile comprises a temperature measurement made on an outer wall of the blank.

4. The method according to claim 1, characterized in that the actual thermal profile comprises a temperature measurement made on an inner wall of the blank.

5. The method according to claim 1, characterized in that the singular pressure point is a local pressure peak.

6. The method according to claim 1, characterized in that the heating profile comprises an electric power ($P_S$) delivered to the radiation sources.

7. The method according to claim 1, characterized in that the heating profile comprises an electric power ($P_V$) delivered to a ventilation system of the oven.

8. A method of manufacturing containers from blanks of plastic material on a production line comprising a critical machine for processing a container following a blow molding of the blanks in a blowing unit, the critical machine having a certain tempo, the method comprises:

a phase of heating blanks as the blanks pass through an oven provided with a plurality of radiation sources at a predetermined speed of travel and heating profile;

a phase of blowing the blanks in the blowing unit, in order to form the containers, wherein the phase of blowing comprises:

(a) modifying the speed of travel of the blanks in accordance with the tempo of the critical machine, wherein the modification is incremental and corresponds only to a percentage of the final modification sought;

(b) modifying the heating profile based on the modified speed of travel;

(c) establishing, at the end of a phase of heating, an actual thermal profile of at least one blank;

(d) measuring a pressure in the blank during the phase of blowing phase and detecting a pressure point from the measured pressure;

(e) measuring a first difference between the actual thermal profile of the blank and a theoretical thermal profile, and a second difference between the pressure point and a theoretical pressure point;

(f) as long as the differences are not both below a respective predetermined tolerance, repeat operations b) to e);

(g) as long as the differences are both below the respective tolerance, repeat operations a) to e) until the speed of travel has reached a predetermined final value.

* * * * *